(12) United States Patent
Liu et al.

(10) Patent No.: US 10,348,595 B2
(45) Date of Patent: Jul. 9, 2019

(54) MANAGING DATA-DRIVEN SERVICES

(71) Applicant: Microsoft Technology Licensing, LLC, Redmond, WA (US)

(72) Inventors: Zhen Liu, Tarrytown, NY (US); Bobby Chiu Chun Mak, Beijing (CN); Michael Timothy Fischer, Duvall, WA (US); Yet Luong Huynh, Beijing (CN); Chen Liu, Beijing (CN); Xin Peng, Beijing (CN); Joe Zhu, Beijing (CN); Jingmei Jessica Li, Beijing (CN); Chunyi Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 14/557,318

(22) Filed: Dec. 1, 2014

(65) Prior Publication Data

US 2016/0021198 A1     Jan. 21, 2016

(30) Foreign Application Priority Data

Jul. 15, 2014   (WO) ................ PCT/CN2014/082222

(51) Int. Cl.
    *H04L 12/58*     (2006.01)
    *G06F 12/14*     (2006.01)
    (Continued)

(52) U.S. Cl.
    CPC ............ *H04L 43/0876* (2013.01); *G06F 8/10* (2013.01); *G06F 8/35* (2013.01); *G06F 9/46* (2013.01);
(Continued)

(58) Field of Classification Search
    CPC ...................................................... H04L 67/16
    See application file for complete search history.

(56) References Cited

U.S. PATENT DOCUMENTS

| | | |
|---|---|---|
| 6,594,700 B1 | 7/2003 | Graham et al. |
| 6,947,903 B1 | 9/2005 | Perry |

(Continued)

FOREIGN PATENT DOCUMENTS

| | | |
|---|---|---|
| CN | 1924915 A | 3/2007 |
| CN | 101075304 A | 11/2007 |

(Continued)

OTHER PUBLICATIONS

"International Search Report and Written Opinion Issued in PCT Application No. PCT/CN2014/082222", dated Apr. 21, 2015, 13 Pages.

(Continued)

*Primary Examiner* — Nicholas R Taylor
*Assistant Examiner* — Sanjoy Roy
(74) *Attorney, Agent, or Firm* — Workman Nydegger

(57) ABSTRACT

The present invention extends to methods, systems, and computer program products for managing data-driven services. Aspects of the invention include a platform for data services. The platform manages data and associated data models holistically together. The platform enables and integrates data-driven services through a service model. The platform transforms data into information and information into intelligence and exposes insights to services. The platform allows for data and service sharing across domains.

15 Claims, 10 Drawing Sheets

(51) Int. Cl.
    *H04L 12/26*     (2006.01)
    *G06F 8/10*     (2018.01)
    *G06F 8/35*     (2018.01)
    *G06F 9/46*     (2006.01)
    *H04L 12/24*     (2006.01)

(52) U.S. Cl.
    CPC ...... *H04L 41/5054* (2013.01); *H04L 41/5096* (2013.01)

(56) References Cited

U.S. PATENT DOCUMENTS

| | | | |
|---|---|---|---|
| 2002/0026499 A1* | 2/2002 | Cantone | G06F 17/3089 709/219 |
| 2007/0136236 A1 | 6/2007 | Kussmaul et al. | |
| 2007/0244650 A1* | 10/2007 | Gauthier | G06Q 10/10 702/19 |
| 2008/0065656 A1* | 3/2008 | Theeten | G06F 17/30566 |
| 2008/0294996 A1* | 11/2008 | Hunt | G06Q 30/02 715/739 |
| 2010/0023482 A1* | 1/2010 | Mershon | G06F 17/30855 707/E17.014 |
| 2010/0131254 A1 | 5/2010 | Rubin et al. | |
| 2011/0066457 A1* | 3/2011 | Chang | G06Q 10/10 707/600 |
| 2011/0077958 A1* | 3/2011 | Breitenstein | G06Q 10/10 705/2 |
| 2011/0119293 A1 | 5/2011 | Taylor et al. | |
| 2011/0208788 A1 | 8/2011 | Heller et al. | |
| 2011/0219354 A1* | 9/2011 | Zhang | G06Q 10/06 717/104 |
| 2014/0136452 A1* | 5/2014 | Wellman | G06N 5/04 706/12 |
| 2014/0297395 A1* | 10/2014 | Chao | G06Q 30/0201 705/14.41 |
| 2014/0343955 A1* | 11/2014 | Raman | G06F 19/3431 705/2 |

FOREIGN PATENT DOCUMENTS

| | | |
|---|---|---|
| CN | 101452450 A | 6/2009 |
| WO | 02052431 A1 | 7/2002 |

OTHER PUBLICATIONS

"Search Report Issued in European Patent Application No. 14897540. 2", dated Jan. 31, 2018, 7 Pages.

"Data Analytics as a Service: Unleashing the Power of Cloud and Big Data", Retrieved From https://atos.net/wp-content/uploads/2017/10/01032013-AscentWhitePaper-DataAnalyticsAsAService.pdf, Mar. 26, 2013, 18 Pages.

"Supplementary Search Report Issued in European Patent Application No. 14897540.2", dated May 30, 2018, 19 Pages.

Schlegel, et al., "Magic Quadrant for Business Intelligence and Analytics Platforms", Retrieved From http://business-view.dk/wp-content/uploads/2015/02/Magic-Quadrant-for-Business-Intelligence-and-Analytics-Platforms-ALL.pdf, Feb. 5, 2013, 44 Pages.

"First Office Action and Search Report Issued in Chinese Patent Application No. 201480049455.0", dated Dec. 17, 2018, 15 Pages.

* cited by examiner

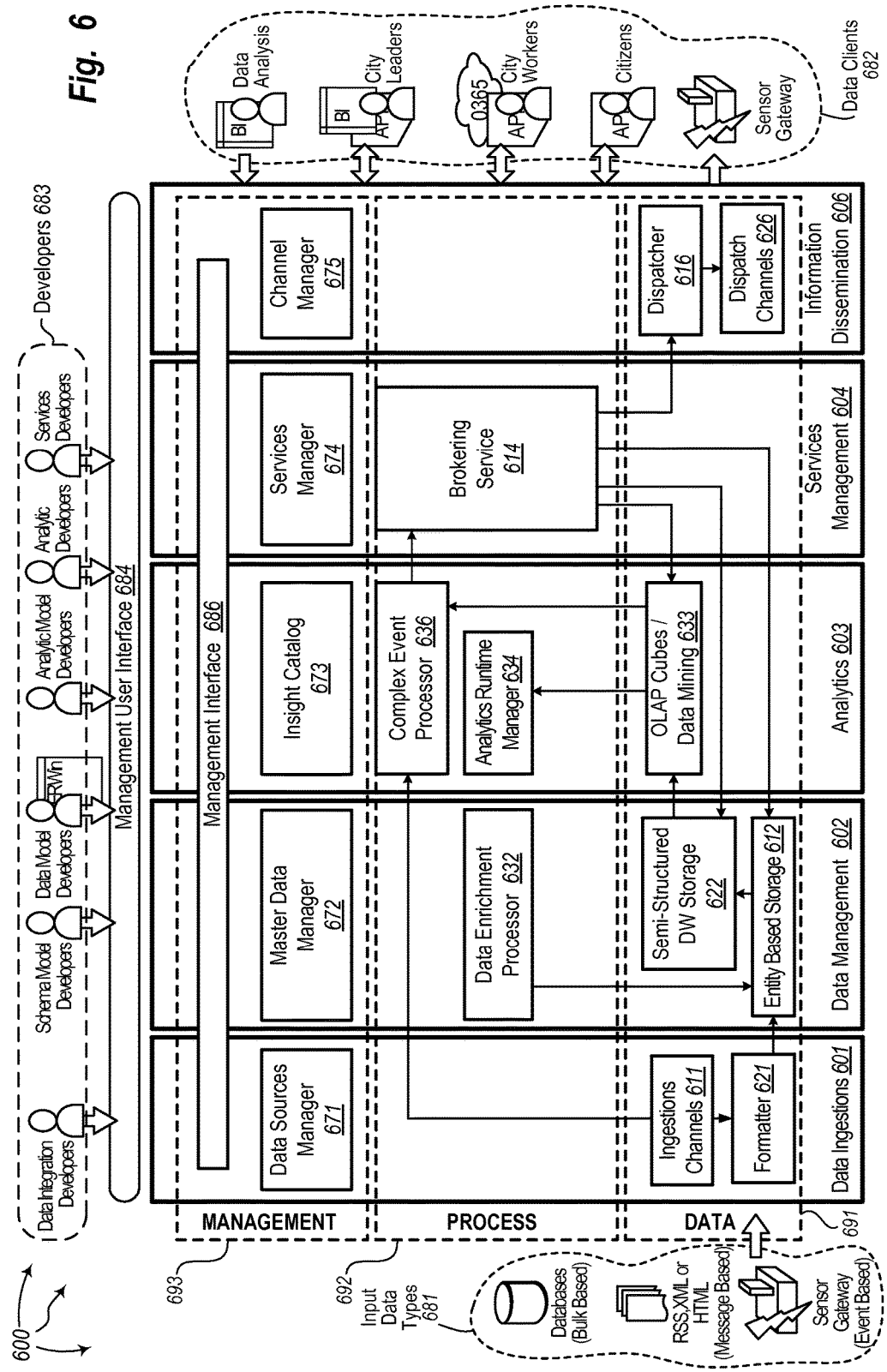

MANAGING DATA-DRIVEN SERVICES

CROSS-REFERENCE TO RELATED APPLICATIONS

This application claims priority to PCT Application No. CN2014/082222, filed Jul. 15, 2014, and entitled "MANAGING DATA-DRIVEN SERVICES"

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Data provided to computer systems can come from any number of different sources, such as, for example, user input, files, databases, applications, sensors, etc. In some environments, computer systems receive (potentially large volumes of) data from a variety of different domains and/or verticals. Enabling general database services that span data from different domains and/or verticals can be difficult. For example, data from different domains and/or verticals can have different schemas and/or different associated security mechanisms making meaningful integration of the data difficult.

It can also be difficult for analytics to derive insight across data from different domains and/or verticals and expose insights to other users/services. Further, since data from different domains and/or verticals often have different associated security mechanisms, it can be difficult to provide unified security control across data access, analytics, and service deployment.

To some extent, Service Oriented Architecture (SOA) can be used for service integrations. However, SOA services are run with autonomous and independent data stores.

BRIEF SUMMARY

The present invention extends to methods, systems, and computer program products for integrating data-driven services. In one aspect, services are enabled based on data from multiple different domains. Data from different domains are managed and shared together through an associated data model. Data-driven services are enabled and shared across domains through an associated service model. An analytics service exposes insights into data and services.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations thereof which are illustrated in the appended drawings. Understanding that these drawings depict only some implementations of the invention and are not therefore to be considered to be limiting of its scope, the invention will be described and explained with additional specificity and detail through the use of the accompanying drawings in which:

FIG. 6 illustrates an example computer architecture that facilitates managing and running services against data from different domains.

DETAILED DESCRIPTION

Figure 1:
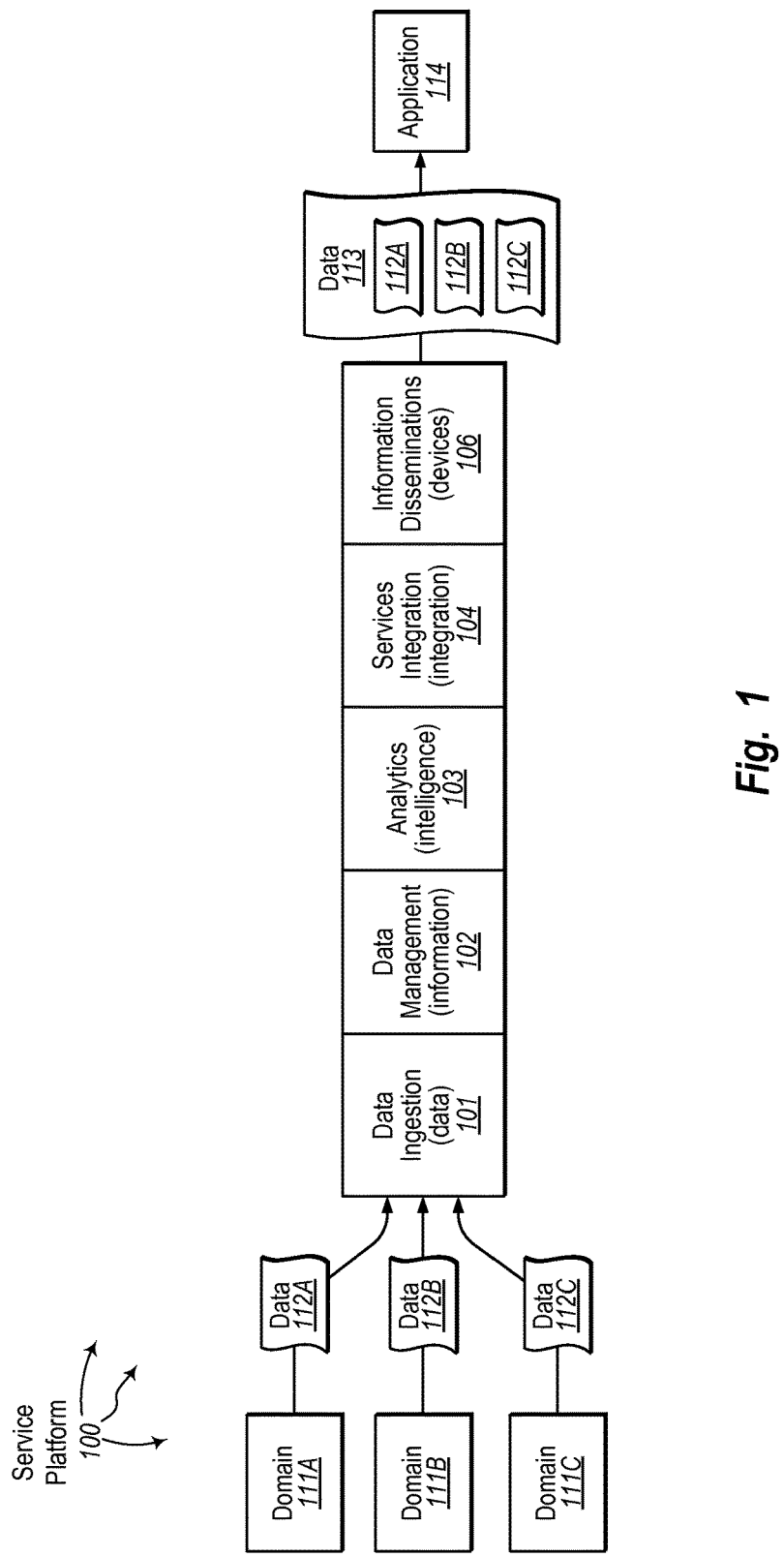
FIG. 1 illustrates an example data-driven service platform.

The present invention extends to methods, systems, and computer program products for integrating data-driven services. In one aspect, services are enabled based on data from multiple different domains. Data from different domains are managed and shared together through an associated data model. Data-driven services are enabled and shared across domains through an associated service model. An analytics service exposes insights into data and services.

Implementations of the present invention may comprise or utilize a special purpose or general-purpose computer including computer hardware, such as, for example, one or more processors and system memory, as discussed in greater detail below. Implementations within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

FIG. 1 illustrates an example data-driven service platform 100. Platform 100 includes data ingestion 101, data management 102, analytics 103, services integration 104, and information dissemination 106. In general, data-driven service platform 100 accesses data, transforms data into information and information into intelligence, and exposes insights to services. Data-driven platform 100 facilitates data and service sharing across domains.

Data-driven service platform 100 can ingest data from a plurality of different domains and/or in a plurality of different raw data formats. Ingested data can be formatted into a common format and stored. Internal and external services can utilized the stored data. Services can aggregate, share, exchange, and process data as well as integrate and compose with other services. Analytics can expose insights into data and services. Analytics can be treated as a first class object within built in training and parameterization. In one aspect, analytics is an internal service.

As such, data ingestion 101 can receive data from a number of different domains and format received data into a common format (e.g., key-value pairs) in accordance with a data model. Data ingestion can send commonly formatted data to data management 102.

For example, data ingestion 101 can receive data 112A, 112B, and 112C from domains 111A, 111B, and 111C respectively. Each of domains 111A, 111B, and 111C can related to different subject matter. For example, domain 111A can be associated with healthcare, domain 111B can be associated with education, and domain 111C can be associated with transportation. Each of domains 111A, 111B, and 111C can also send data in a different raw data format. For example, domain 111A can send Character (comma) Separated Value (CSV) data, domain 111B can send eXtensible Markup Language (XML) data, and domain 111C can send Real Site Summary (RSS) data. Data ingestion 101 is configured to format these (and other) different raw data formats into a common format in accordance with a data model.

Data management 102 is configured to receive and store data in the common format. Services and analytics can then access the stored data as appropriate. For example, analytics 103 is configured to access data from data management 102 and derive insights from accessed data. The insights can be exposed to users and services. Services integration 104 is configured to integrate (e.g., data-driven) services with data from data management 102, with other services, and with insights exposed by analytics 103. For example, a service in services integration 104 can integrate 112A, 112B, and 112C to form a solution to a business related problem Information dissemination 106 is configured to disseminate output from services integration 104 to data clients. For example, information disseminations 106 can send data 113 to application 114. As depicted, data 113 contains data 112A, 112B, and 112C. Thus, application 114 can be made aware of data that spans domains 111A, 111B, and 111C.

Figure 2:
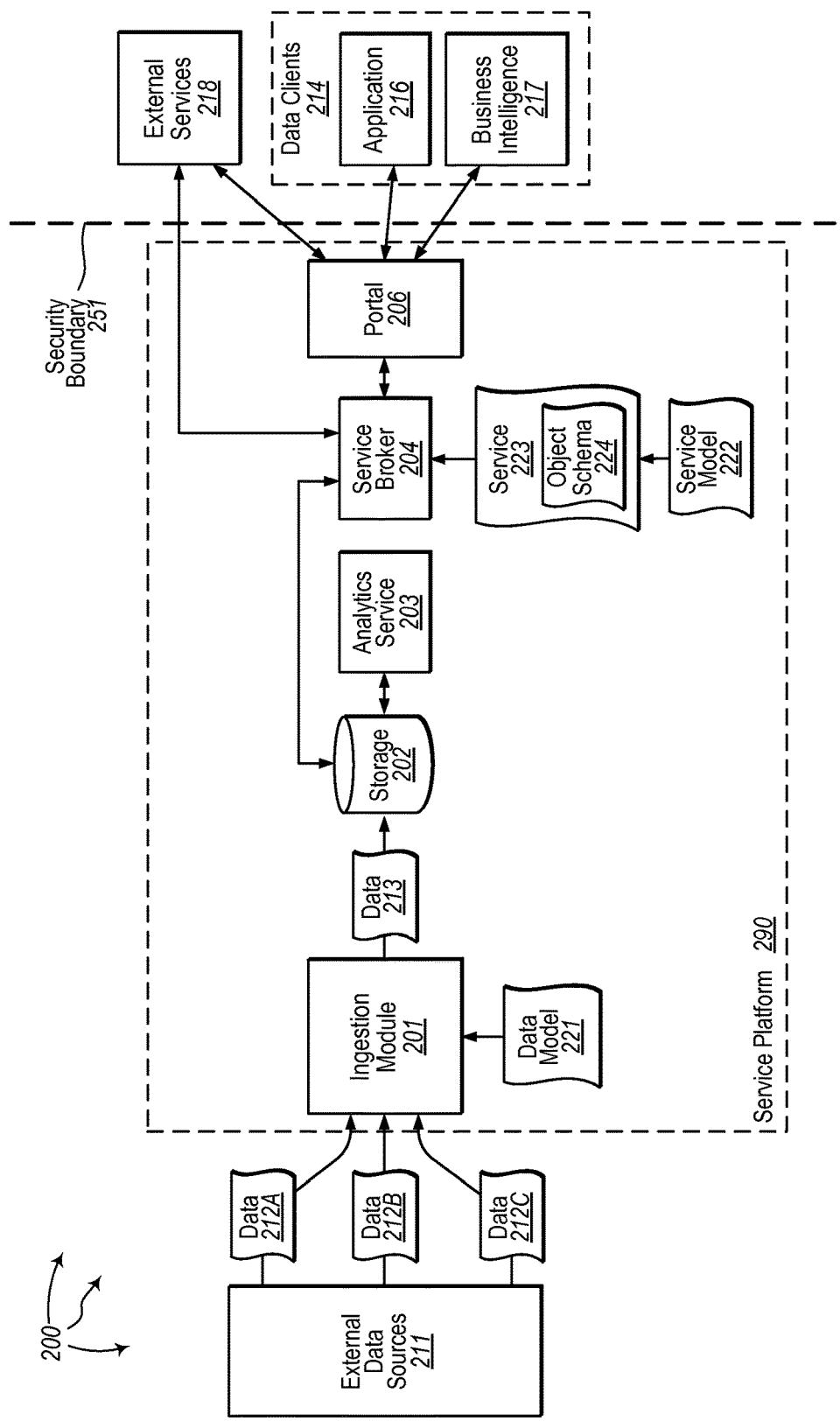
FIG. 2 illustrates an example computer architecture that facilitates managing and running services against data from different domains.

FIG. 2 illustrates an example computer architecture 200 that facilitates managing and running services against data from different domains. Referring to FIG. 2, computer architecture 200 includes external data sources 211, service platform 290, data clients 214, and external services 218. Each of external data sources 211, service platform 290, data clients 214, and external services 218 can be connected to one another over (or be part of) a network, such as, for example, a Local Area Network ("LAN"), a Wide Area Network ("WAN"), and even the Internet. Accordingly, each of external data sources 211, service platform 290, data clients 214, and external services 218, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, security boundary 251 separates external services 218 and data clients 214 from service platform 290. External services 218 and data clients 214 can be located on a public network, such as, for example, the Internet. Service platform 290 can be located on a private network, such as, for example, a corporate intranet. Thus, components implementing security boundary 251 (e.g., a firewall) protect service platform 290 from threats originating on the public network.

Service platform 290 further includes ingestion module 201, storage 202, analytics service 203, service broker 205, and portal 206, data clients 214. Ingestion module 201 is configured to ingest data from external data sources and refer to data model 221 to format ingested data into a common format. For example, ingestion module 201 can ingest data 212A, 212B, and 212C. Ingestion module 201 can refer to data model 221 to format 212A, 212B, and 212C into commonly formatted data 213. Ingestion module 201 can store data 213 in storage 202.

As such, storage 202 can store data that is integrated across different domains. Data integration can be facilitated by multi-dimensional and/or tabular models.

Analytics service 203 can access data 213 (along with other data) to derive insights into data 213 (along with the other data) and expose the derived insights to services. Services can be configured in accordance with a service model.

Service broker 204 manages execution of internal services. For example, service 223 can be an internal service configured in accordance with service model 222. Service 223 includes object schema 224. Object schema 224 defines how data is to be accessed when read from storage 202. Object schema 224 can map from the common data format into a data format desired by a data client. Internal services can store data back into storage 202. In one aspect, internal services synthesize new arrangements of data from existing data. The synthesized data arrangements can be stored back into storage 202 for further use and sharing.

Service broker 204 can also manage execution of external services 218. External services 218 can also be configured in accordance with service model 222. External services 218 can access service platform 290 for data via an external services account for both authentication and authorization. In one aspect, external services 218 access service platform 200 using HyperText Transfer Protocol (HTTP) Simple Object Access Protocol (SOAP) with content compliance with WS-Security (encryption and signature) using a private key issued by service platform 290. External services 218 can also synthesize new arrangements of data from existing data. These synthesized data arrangements can be stored back into storage 202 for further use and sharing.

Portal 206 interfaces between service broker 204 and data clients 214. As depicted, data clients 214 include application 216 and business intelligence 217. Portal 206 can send output from services to data clients 214. Data clients 214 can also input data back into portal 206. The input data can be stored back into storage 202 for further use and sharing.

Data model 221 can be a comprehensive data model capable of modeling (a potentially large) plurality of different data types. Data model 221 can be composed of data entity relationship and object schemas. As such, data model 221 can enable data transformation and discovery and sharing across domains, while managing volumes, velocity, variety, and variation within modeled data.

Figure 3A:
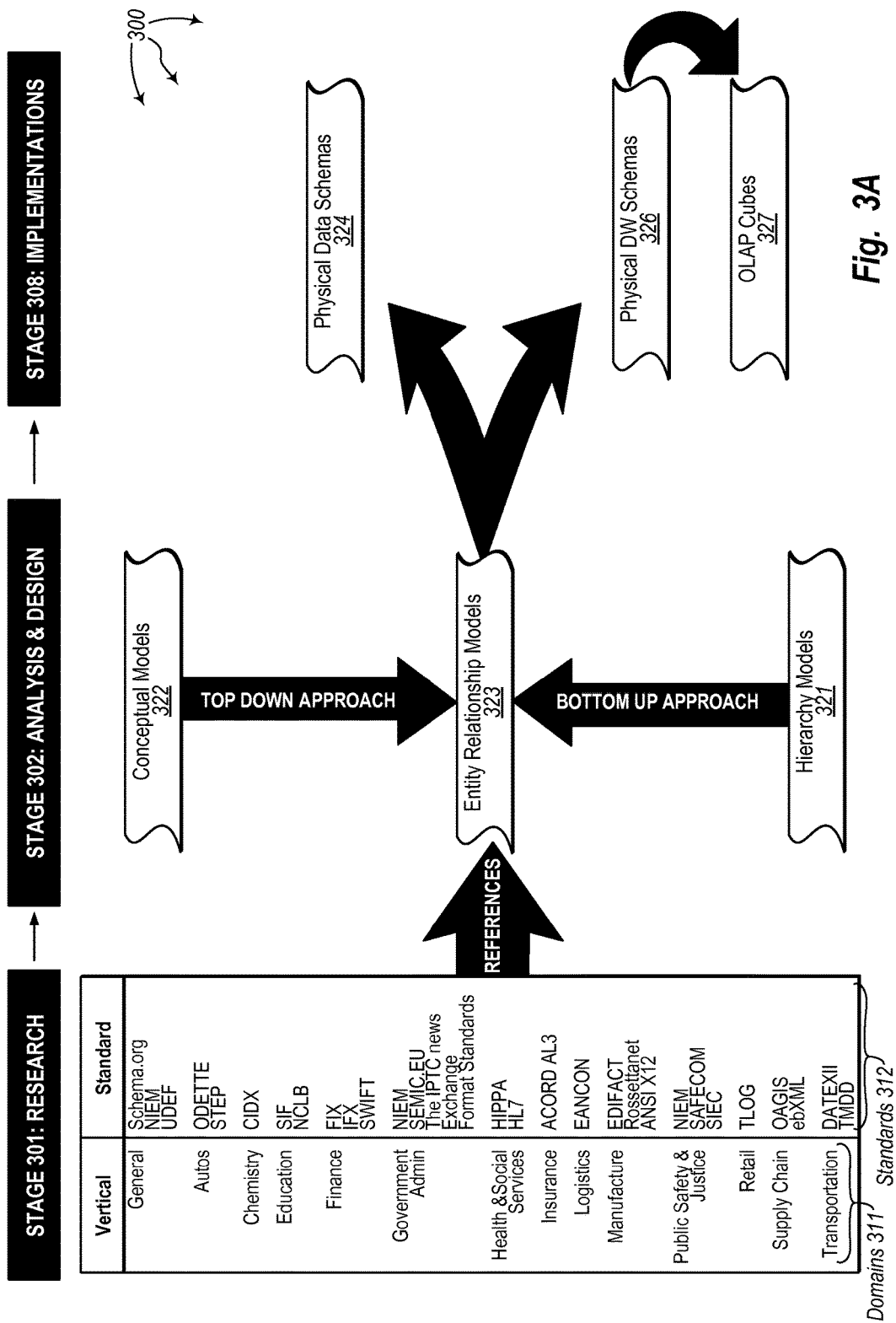
FIGS. 3A-3D illustrates a data flow for formulating entity relationship models and implementing corresponding schemas.

FIGS. 3A-3D illustrates a data flow 300 for formulating entity relationship models and implementing corresponding schemas. As depicted in FIG. 3A, data flow 300 begins at stage 301 research. In stage 301 domains 311 and standards 312 are researched. In stage 302 analysis and design, hierarchy models 321 are used in a bottom approach and conceptual models 322 are used in a top down approach to derive entity relationship models 323. Entity relationship models 323 reference back to domains 311 and standards 312. As such, an ingestion module can utilize entity relationship models 323 to ingest data from any of domains 311 in any of standards 312.

In stage 303 implementations, physical data schemas 324, physical DW schemas 326, and online analytical processing (OLAP) cubes 327 can be formulated. Physical data schemas 324 can be used at read time to map between entity relationship models 323 and output desired by a data client (e.g., application 216 or business intelligence 217) or service (e.g., service 223 or enteral services 218). Physical DW schemas 326 and online analytical processing (OLAP) cubes 327 can be used at read time to map between entity relationship models and output desired by an analytics service (e.g., analytics service 203).

Figure 3B:
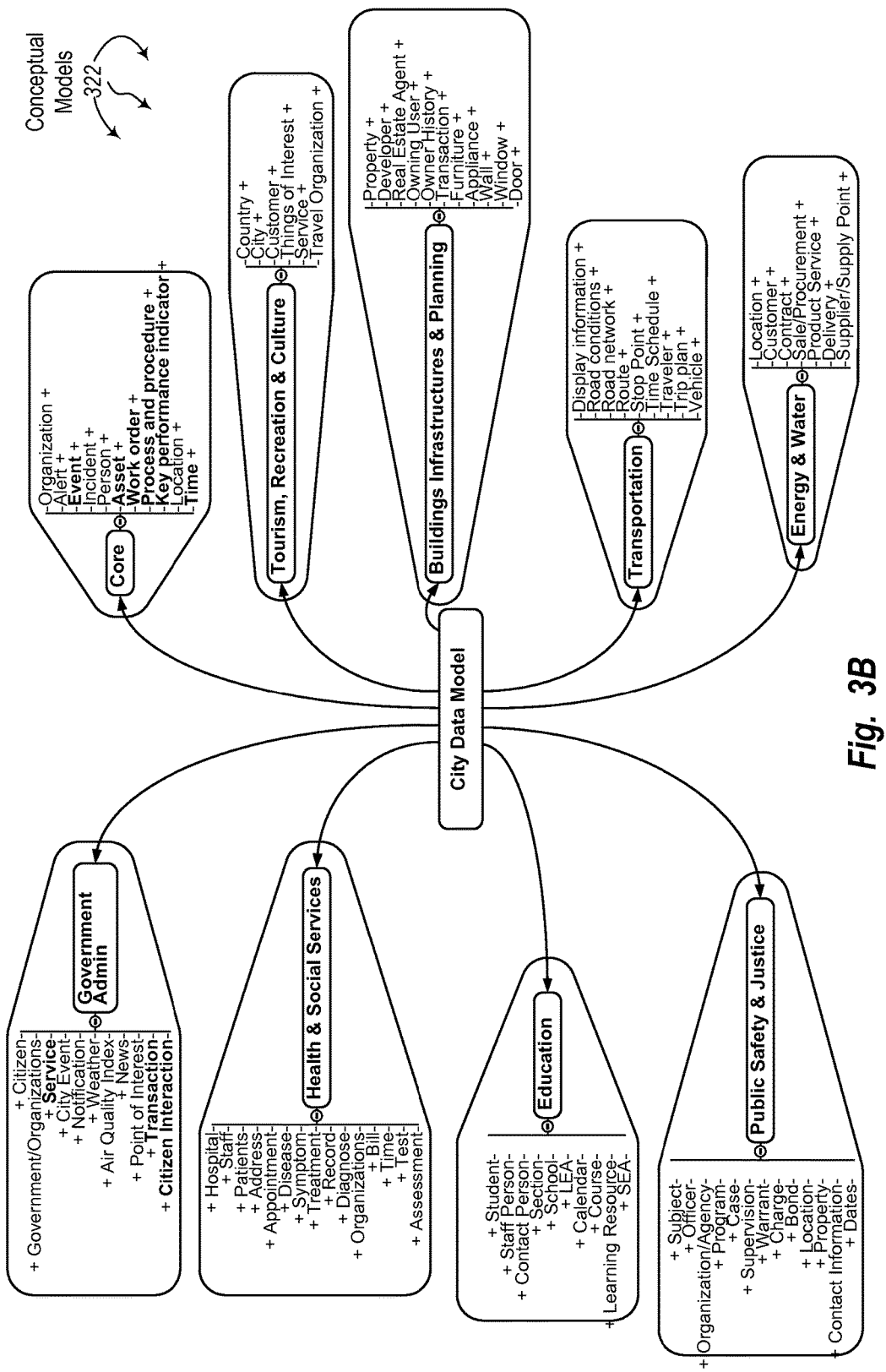
Figure 3C:
Figure 3D:
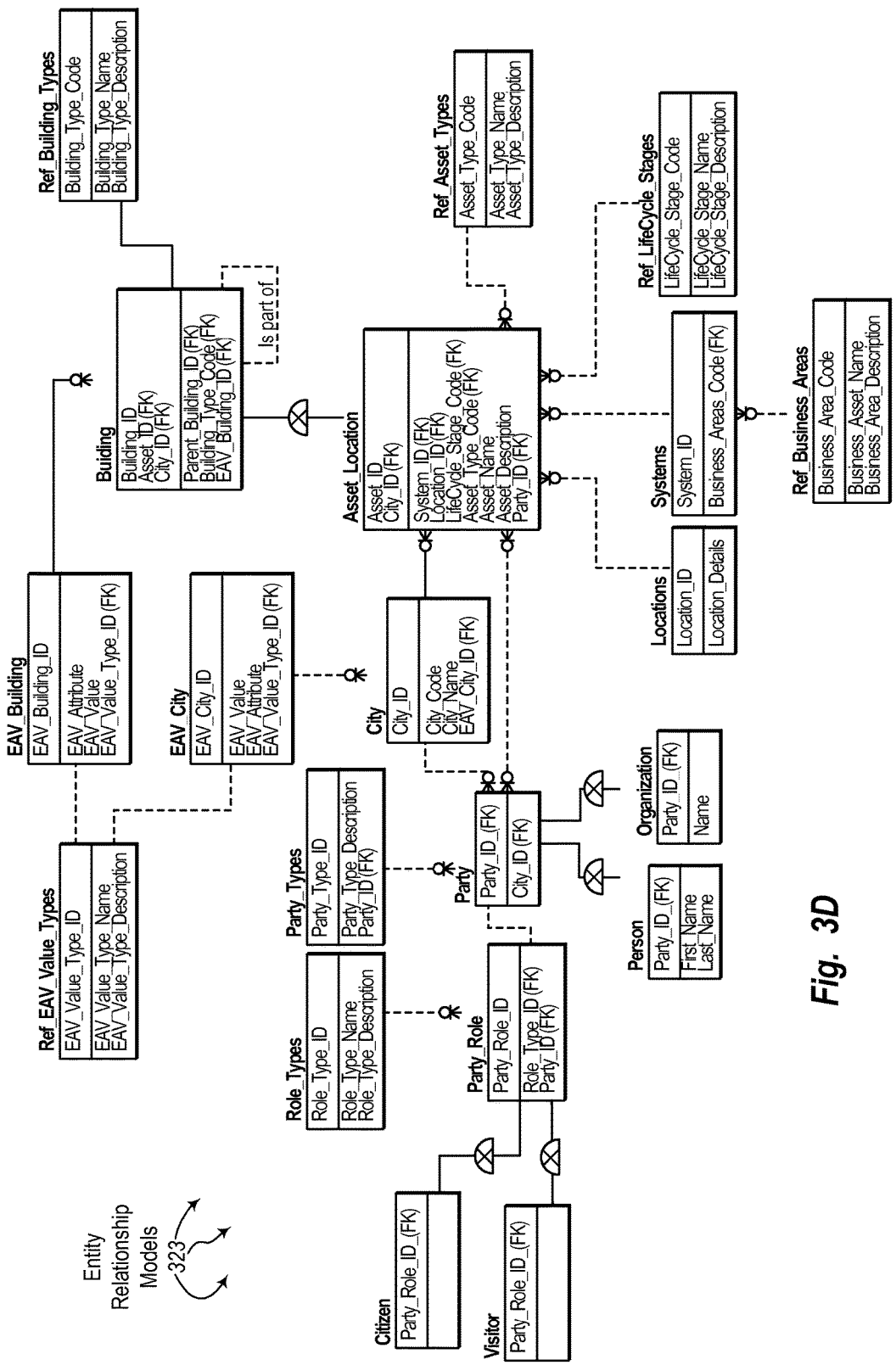

Turning to FIGS. 3B-3D, FIG. 3B depicts an example of conceptual models 322. FIG. 3C depicts an example of hierarchy models 321. FIG. 3D depicts an example of entity relationship models 323.

Referring briefly back to FIG. 2, service model 222 allows data to be augmented via services. That is, services can generate dynamic data based on static data. Service model 222 also makes data easier to consume via relevant services for developers and makes data and services discoverable via a usage model.

Figure 3E:
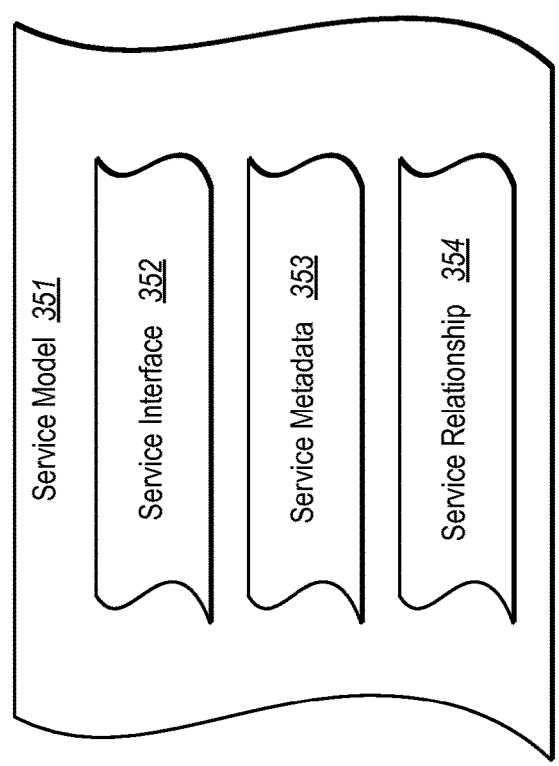
FIG. 3E illustrates an example service model.

FIG. 3E illustrates an example service model 351. Service model 222 can be similar to (or even the same as) service model 351. As depicted, service model 351 includes service interface 352, service metadata 353, and service relationship 354. Service interface 352 defines a set of service contracts for an entity (e.g., an owner (business) of a service or data accessed by a service). Service interface 352 can also define a relationship with category and data model. Service metadata 353 contains a description of the service, for example, name, description, publisher, endpoint, operations, etc. Service relationship 354 defines the relationship of a service with other services, a data model, and categories (e.g., functional, algorithm, programming, etc.).

As such, services executed in service platform 100 and/or computer architecture 200 can adhere to service model 351. An analytics service (e.g., analytics service 203) can refer to a service interface, service metadata, and service relationships for a service to derive insights into the service. Insights about a service can be stored for use by other services.

Figure 4:
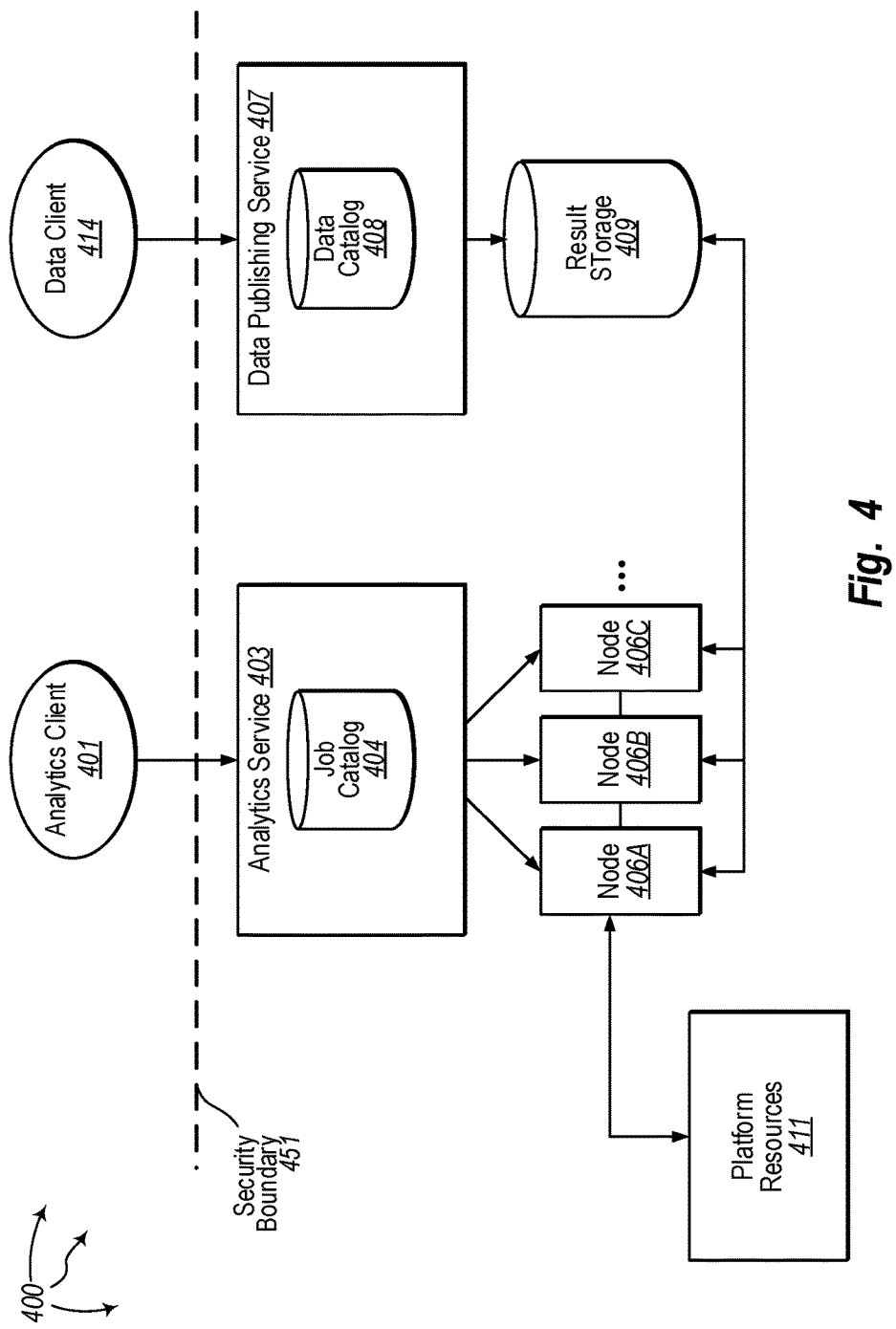
FIG. 4 illustrates an example computer architecture for an analytics service.

Turning to FIG. 4, FIG. 4 illustrates an example computer architecture 400 for an analytics service. As depicted, computer architecture 400 includes analytics client 401, analytics service 403, data client 414, data publishing service 407, nodes 406A, 406B, and 406C, results storage 409, and platform resources 411. Security boundary 451 (e.g., a firewall) separates analytics client 401 and data client 414 from the other components of computer architecture 400 to isolate the other components from external threats. Analytics service 203 can be similar to (or even the same as) analytics service 403.

In general, analytics service 403 can transform data into information and information into intelligence. Analytics service 403 can manage and run jobs in the isolated environment behind security boundary 451. Analytics client 401 can create and send jobs to analytics service 403. Analytics client 401 can elect to run these jobs on a schedule, or manually. Analytics service 403 can store received jobs in job catalog 404 for subsequent use.

Each of compute nodes 406A, 406B, and 406C contain a scheduler for jobs to be run on that node. Jobs run at compute nodes 406A, 406B, and 406C consume platform resources 411. Platform resources 411 can include static data sets accessed via query, and streaming data received via push. Raw data in result storage 409 can be shared through data publishing service 407, which maintains a data catalog 408 of published data. For example, data client 414 can access raw data from results storage 409.

For scalability, the same job can be run simultaneously on multiple nodes. Even though nodes 416A, 416B, and 416C are not accessible from the outside, job output (including crash reports) can be made available analytics service 403.

Further, each job can run on a dedicated compute node under the security context of the user who created it, so the job can access the resources that the user can access. Result storage 409 can contains dedicated space for each user, provisioned during user onboarding and protected with a quota. Data publishing service 407 can contain controls to enforce security on the published data sets.

Figure 5:
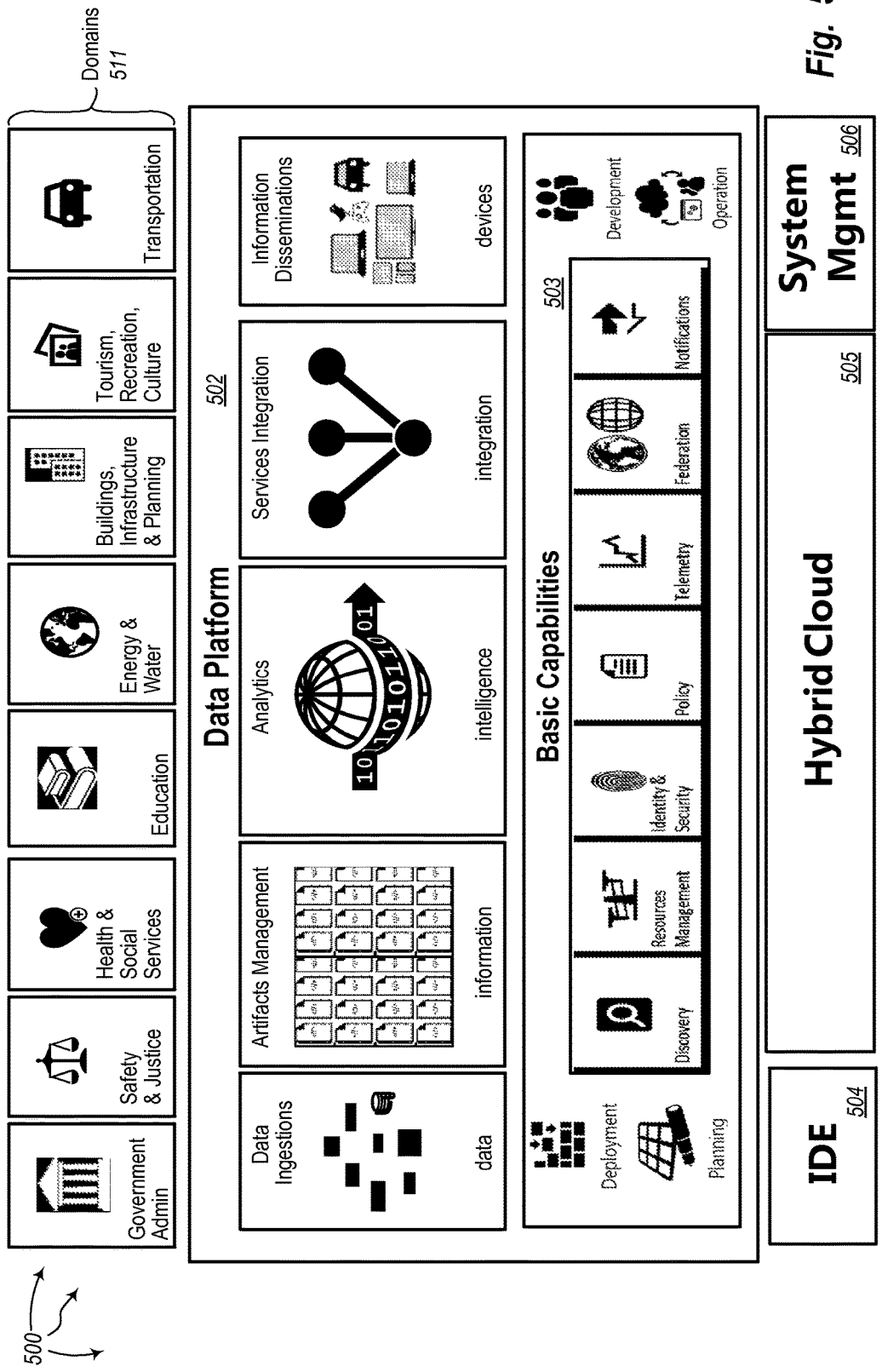
FIG. 5 illustrates an example computer architecture that facilitates managing and running services against data from different domains.

FIG. 5 illustrates an example computer architecture 500 that facilitates managing and running services against data from different domains. As depicted, data platform 502 utilized basic capabilities 503. Basic capabilities 503 sit on top of integrated development environment (IDE) 504, hybrid cloud 505, and system management 506. Data platform 502 can ingest, store, and process, data from any of domains 511.

FIG. 6 illustrates an example computer architecture 600 that facilitates managing and running services against data from different domains. As depicted, data ingestions 601, data management 602, analytics 603, service management 604, and information dissemination 606 are layered across data 691, process, 692, and management 693.

Within management 693, management interface 686 can be used to access data sources manager 671, master data manager 672, insight catalog 673, services manager 674, and channel manager 675. Developers 683 can use management user experience 684 to access relevant management modules through management interface 686. For example, a data model developer can use management user experience 684 to access master data manager 672 through management interface 686. Management modules can be used to manage corresponding components at process 692 and data 691. For example, data sources manager 671 can be used to manage ingestion channels 611 and formatter 621.

Ingestion channels 611 are configured to ingest input data types 681 (e.g., bulk based data, message based data, event based data, etc). Formatter 621 can format input data types 681 into a comma format (e.g., through reference to a data model). Formatter 621 can store commonly formatted data in entity based storage 612 (e.g., a key-value pairs). Data enrichment processor 632 can enrich data stored in entity based storage 612. A physical DW schema can be applied to data in entity based storage 612 to prepare the data for storage in semi-structured DW storage 622.

OLAP cubes/data mining 623 can be populated from data in semi-structured DW storage 622. Analytics runtime manager 634 can then perform analytics based on OLAP cubes/data mining 623. Complex event processor 636 can also utilize OLAP cubes/data mining 623 in combination raw ingested data from ingestion channels 611. Results from complex event processor 636 can be sent to brokering service 614.

Brokering service 614 can manage the execution of services (e.g., services configured in accordance with a service model). Based on a service being executed, brokering service 614 can read data from and/or write data to one or more of: entity based storage 612, semi-structured DW storage 622, OLAP cubes/data mining 623, and dispatcher 616. Dispatcher 616 can dispatch service output to data clients 682 through dispatch channels 626.

Accordingly, aspects of the invention include a platform for data services. The platform manages data and associated data models holistically together. The platform enables and integrates data-driven services through a service model. The platform transforms data into information and information into intelligence and exposes insights to services. The platform allows for data and service sharing across domains.

The present invention may be implemented in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:
1. A system, the system comprising:
one or more processors;
system memory coupled to the one or more processors, the system memory storing instructions that, when executed by the one or more processors, cause the system to:
ingest first data in first data format from a first domain into a service platform;
ingest second data in a second data format from a second domain into the service platform;

transform the first data and the second data into a common format through reference to a data model, the data model defining data entity relationship schemas and object schemas to facilitate data transformation, discovery, and sharing across the first domain, the second domain, and one or more additional domains;

store the commonly formatted data for shared access by a plurality of services, each of the plurality of services having at least one of a plurality of different security mechanisms;

integrate an internal service with an external service, the internal service being inside a security boundary and the external service being outside the security boundary;

synthesize a new arrangement of data inside the security boundary based on the first data and the second data in the common format, the first data and the second data accessed based on a service contract for the first data, a service contract for the second data, and the integrated internal service and external service having a previously defined relationship with the data model;

transform the synthesized new arrangement of data into client output; and send the client output across the security boundary to a data client outside the security boundary.

2. The system of claim 1, wherein the one or more processors executing the instructions stored in the system memory to ingest first data comprises the one or more processors executing the instructions stored in the system memory to ingest one or more of: bulk based data, message based data, or event based data.

3. The system of claim 1, wherein the one or more processors executing the instructions stored in the system memory to transform the first data and the second data into a common format comprises the one or more processors executing the instructions stored in the system memory to format the first data and the second data into key-value pairs.

4. The system of claim 1, wherein the one or more processors executing the instructions stored in the system memory to transform the first data and the second data into a common format comprises the one or more processors executing the instructions stored in the system memory to transform the first data in accordance a data model, wherein the data model was derived by applying a conceptual model and a hierarchy model to the first data format and the second data format to derive the entity relationship schemas.

5. The system of claim 1, wherein the one or more processors executing the instructions stored in the system memory to synthesize new arrangement of data comprises the one or more processors executing the instructions stored in the system memory to synthesize the new arrangement of data via the external services account.

6. The system of claim 1, wherein the one or more processors executing the instructions stored in the system memory to synthesize new arrangement of data comprises the one or more processors executing the instructions stored in the system memory to synthesize one or more OLAP cubes.

7. A system, the system comprising:
one or more processors;
entity based storage;
system memory coupled to the one or more processors, the system memory storing instructions that are executable by the one or more processors to cause the system to:

transform data ingested from a plurality of different domains into a common format through reference to a data model, the data model defining data entity relationship schemas and object schemas to facilitate data transformation, discovery, and sharing across the plurality of domains;

store the commonly formatted data in the entity based storage for security controlled shared access by a plurality of services, each of the plurality of services having at least one of a plurality of different security mechanisms;

integrate an internal service with the external service, the internal service being inside a security boundary and the external service being outside the security boundary;

synthesize a new arrangement of data inside the security boundary from the ingested data in the common format;

transform the synthesized new arrangement of data into client output; and send the client output across the security boundary to a data client outside of the security boundary.

8. The system of claim 7, wherein the one or more processors executing the instructions stored in the system memory to transform data ingested from a plurality of different domains in a common format comprises the one or more processors executing the instructions stored in the system memory to refer to a data model that was derived by applying a conceptual model or a hierarchy model to the ingested data to derive the entity relationship schemas.

9. The system of claim 7, wherein the one or more processors executing the instructions stored in the system memory to synthesize a new arrangement of data comprises the one or more processors executing the instructions stored in the system memory to synthesize one or more processors OLAP cubes.

10. A system, the system comprising:
one or more processors;
one or more compute nodes and result storage inside a security boundary;
system memory coupled to the one or more processors, the system memory storing instructions that, when executed by the one or more processors, cause the system to:
  receive a job from an analytic client outside the security boundary, the security boundary separating an analytics service from the analytics client;
  execute the received job at the one or more compute nodes, including:
    access first data from a first domain, second data from a second domain, and a synthesized arrangement of data from the results storage, the synthesized arrangement of data synthesized from the first data and the second data, wherein the first data, the second data, and the synthesized arrangement of data are stored in a common format, the common format from a data model that defines data entity relationship schemas and object schemas to facilitate data transformation, discovery, and sharing across the first domain, the second domain, and one or more additional domains;
  share the first data, the second data, and the synthesized arrangement of data with the analytics service, the first data, the second data, and the synthesized arrangement of data shared based on one or more service contracts and the analytics service having a previously defined relationship with the data model;

derive an insight for a data-driven service from the first data, second data, and synthesized arrangement of data;

store the insight in the results storage;

send the insight from inside the security boundary through the security boundary to a data client outside of the security boundary through a portal;

receive additional data from the data client through the portal, the data client outside the security boundary; and store the additional data in the results storage in the common format from the data model.

11. The analytics system of claim 10, wherein the one or more processors executing the instructions stored in the system memory to execute a received job on the one or more compute nodes comprises the one or more processors executing the instructions stored in the system memory to execute a received job in the security context of the analytics client.

12. The analytics system of claim 10, wherein the one or more processors executing the instructions stored in the system memory to access the first data, the second data, and the synthesized arrangement of data comprises he one or more processors executing the instructions stored in the system memory to access data from entity based storage.

13. The analytics system of claim 10, wherein the one or more processors executing the instructions stored in the system memory to derive an insight for a data-driven service from the data comprises the one or more processors executing the instructions stored in the system memory to refer to a service relationship defined for the data-driven service, the service relationship defining a relationship between the service and the data model.

14. The analytics system of claim 10, wherein the one or more processors executing the instructions stored in the system memory to access the first data, the second data, and the synthesized arrange of data comprises the one or more processors executing the instructions stored in the system memory to access streaming data received via push.

15. The analytics system of claim 10, wherein the one or more processors executing the instructions stored in the system memory to derive an insight for a data-driven service from the data comprises the one or more processors executing the instructions stored in the system memory to refer to a service relationship defined for the data-driven service, the service relationship defining a relationship between the service and one or more other services.

* * * * *